United States Patent
Yazawa et al.

(10) Patent No.: US 7,520,669 B2
(45) Date of Patent: Apr. 21, 2009

(54) PROCESSOR, PROCESSOR SYSTEM, TEMPERATURE ESTIMATION DEVICE, INFORMATION PROCESSING DEVICE, AND TEMPERATURE ESTIMATION METHOD

(75) Inventors: Kazuaki Yazawa, Chiba (JP); Iwao Takiguchi, Kanagawa (JP); Atsuhiko Imai, Tokyo (JP); Tetsuji Tamura, Tokyo (JP); Kenichi Adachi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 234 days.

(21) Appl. No.: 10/591,080

(22) PCT Filed: Apr. 26, 2005

(86) PCT No.: PCT/JP2005/007884

§ 371 (c)(1),
(2), (4) Date: Nov. 13, 2006

(87) PCT Pub. No.: WO2005/119402

PCT Pub. Date: Dec. 15, 2005

(65) Prior Publication Data

US 2008/0043807 A1    Feb. 21, 2008

(30) Foreign Application Priority Data

Jun. 4, 2004    (JP)    .............................. 2004-167806

(51) Int. Cl.
  G01K 1/00    (2006.01)
  G01K 7/00    (2006.01)
  G06F 19/00    (2006.01)
(52) U.S. Cl. ............................. 374/141; 374/100; 716/4
(58) Field of Classification Search ................. 374/166, 374/141, 100, 163; 716/4
See application file for complete search history.

(56) References Cited

U.S. PATENT DOCUMENTS

2002/0065049 A1    5/2002   Chauvel et al.

(Continued)

FOREIGN PATENT DOCUMENTS

JP    09-305268    11/1997

(Continued)

OTHER PUBLICATIONS

International Preliminary Report on Patentability based on corresponding PCT/JP2005/007884, 6 pgs.

(Continued)

*Primary Examiner*—Gail Verbitsky
*Assistant Examiner*—Mirellys Jagan
(74) *Attorney, Agent, or Firm*—Matthew B. Dernier; Gibson & Dernier LLP

(57) ABSTRACT

A temperature sensor measures a temperature of a certain location inside a processor. An overall heat amount measurement unit measures the overall amount of heat of the processor. A temperature estimation unit estimates the temperatures of a plurality of hot spots occurring in the processor based on the temperature of the certain location detected by the temperature sensor, and determines the maximum temperature of the processor. The temperature estimation unit switches between maximum load temperature estimation coefficients and individual load temperature estimation coefficients stored in a storing unit for reference, depending on the overall amount of heat of the processor, and applies them to a temperature estimation function(s) for converting the sensor temperature into the temperatures of the hot spots. An operating frequency control unit exercises control for lowering the operating frequency of the processor when the maximum temperature of the processor estimated by the temperature estimation unit exceeds a predetermined limit temperature.

12 Claims, 11 Drawing Sheets

U.S. PATENT DOCUMENTS

2002/0169924 A1 11/2002 Osborn
2005/0216222 A1* 9/2005 Inoue .................. 702/136
2006/0031794 A1* 2/2006 Li et al. .................. 716/4

FOREIGN PATENT DOCUMENTS

JP 2003-204028 7/2003
JP 2004-126968 4/2004

OTHER PUBLICATIONS

International Search Report based on PCT/JP2005/007884, dated Aug. 2, 2005, 2 pgs.

Office Action to corresponding Japanese Patent Application No. 2004-167806, dated Jul. 19, 2005, 4 pgs.

First Office Action for Chinese Patent Application 2005800016441 dated Sep. 28, 2007.

* cited by examiner

| 65 | 70 | 70 | 55 | 50 |
| 75 | ///85/// | 75 | 60 | 50 |
| 80 | 80 | 65 | (60) | 55 |
| ///85/// | 75 | 60 | 70 | 70 |
| 75 | 70 | 75 | ///85/// | 70 |

| SENSOR TEMPERATURE | $\Delta T_A$ | $\Delta T_B$ | $\Delta T_C$ | MAXIMUM TEMPERATURE |
|---|---|---|---|---|
| 50 | 23 | 25 | 24 | 75 |
| 55 | 25 | 24 | 22 | 80 |
| 60 | 25 | 25 | 25 | 85 |
| ⋮ | ⋮ | ⋮ | ⋮ | ⋮ |

FIG.5A

| SENSOR TEMPERATURE | ΔTA | TA |
|---|---|---|
| 50 | 15 | 65 |
| 60 | 15 | 75 |
| 70 | 15 | 85 |
| ⋮ | ⋮ | ⋮ |

FIG.5B

| SENSOR TEMPERATURE | ΔTB | TB |
|---|---|---|
| 50 | 10 | 60 |
| 60 | 12 | 72 |
| 70 | 15 | 85 |
| ⋮ | ⋮ | ⋮ |

FIG.5C

| SENSOR TEMPERATURE | ΔTC | TC |
|---|---|---|
| 50 | 22 | 72 |
| 60 | 25 | 85 |
| 70 | 27 | 97 |
| ⋮ | ⋮ | ⋮ |

PROCESSOR, PROCESSOR SYSTEM, TEMPERATURE ESTIMATION DEVICE, INFORMATION PROCESSING DEVICE, AND TEMPERATURE ESTIMATION METHOD

BACKGROUND

1. Technical Field

The invention relates to processor technologies, and more particularly to a processor, a processor system, a temperature estimation device, an information processing apparatus, and a temperature estimation method capable of estimating the temperature inside the processor.

2. Related Art

With increasing trends of LSI design toward finer manufacturing processes and higher device integration, it is becoming extremely important, in terms of design, to give consideration to the amount of heat generation as chips' performance limits. Chips can malfunction or drop in long-term reliability when at high temperatures. Various measures against heat generation have thus been taken. For example, in one method, radiating fins are arranged on the top of a chip so as to radiate heat occurring from the chip.

Moreover, uneven distribution of power consumption over a chip inevitably produces the problem of so-called "hot spots," or that the chip partially becomes abnormally high in temperature. Then, it has also been studied to schedule processor tasks based on the distribution of power consumption of a chip (for example, see U.S. Patent Application Publication No. 2002/0065049).

When heat occurs from part of a chip, the high-temperature area spreads out from the location of heat generation with time because of heat conduction, and the entire chip eventually rises in temperature. Conventional measures against heat generation are to embed only a single temperature sensor into a device such as a processor to measure the temperature inside the device, observe the temperature distribution on the entire chip macroscopically, and radiate heat over time of several seconds to a minute or so. This means poor time response. Among latest highly-integrated LSIs are ones that are designed to consume power of around several tens of watts each. Heat radiation processing must therefore be conducted in the order of several tens of microseconds, or a malfunction can occur due to an abrupt rise in temperature.

Powerful cooling mechanisms using a heat sink or the like are thus provided to lower the temperature sharply under circumstances where the power consumption is growing. This increases the heat flux flowing into the heat sink relatively, thereby causing the phenomenon that the heat flux to spread over the chip surface decreases. The small heat resistance to the heat sink formed on the top of the chip can be regarded as an equivalent to a relative drop in the heat conductivity of the chip. In this state, local hot spots can occur easily. As above, since highly-integrated processors cause a plurality of hot spots in places, it has been difficult to grasp the temperatures of the hot spots with a single temperature sensor accurately.

SUMMARY OF THE INVENTION

The present invention has been achieved in view of the foregoing problem. Thus, a general purpose of the present invention is to provide a processor, a processor system, an information processing apparatus, and a temperature estimation method capable of grasping the temperatures at locations of heat generation accurately.

One of the embodiments of the present invention relates to a processor. This processor includes: a sensor which measures a temperature of a certain block of the processor; and a temperature estimation unit which estimates temperatures of a plurality of heat generating blocks of the processor based on the temperature of the certain block detected by the sensor.

As employed herein, the term "blocks" refer to minimum units into which the processor area is sectioned according to the sizes of areas in which spot-like heat peaks occur. For example, a block may include a single element of the processor such as a transistor, or a group of a certain number of elements. With a multiprocessor system containing a plurality of processors, each individual processor may be sectioned into blocks. Otherwise, each individual processor may be regarded as a single block.

The "heat generating blocks" are ones in which spot-like heat peaks occur when a load is applied to the processor, and are equivalent to so-called hot spots.

The processor may further include a storing unit which stores information on differences in temperature between the plurality of heat generating blocks and the certain block for situations where a load is applied to the processor. The temperature estimation unit may estimate the temperatures of the plurality of heat generating blocks by referring to the information on the differences in temperature stored in the storing unit. Examples of the information on the differences in temperature between the plurality of heat generating blocks and the certain block are equations pertaining to the correspondence between the temperature of the certain block detected by the sensor and the temperatures of the plurality of heat generating blocks, and tables showing the correspondence.

The storing unit may contain information on a correspondence between the detected temperature of the certain block and the temperatures of the plurality of heat generating blocks for situations where a maximum load is applied to the entire processor. The storing unit may further contain information on a correspondence between the temperature of the certain block detected by the sensor and the temperatures of the plurality of heat generating blocks for situations where a load is individually applied to the plurality of heat generating blocks, respectively.

As employed herein, the expression "where a maximum load is applied to the entire processor" covers situations where the processor is subjected to as high a load as possible so that it operates as fully as possible. That is, the expression does not necessarily refer to the case where the maximum load in the strict sense is applied.

The expression "where a load is individually applied to the plurality of heat generating blocks, respectively" covers such cases that at least one of the plurality of heat generating blocks undergoes a load selectively while the other heat generating blocks undergo no load or a smaller load.

The processor may include a plurality of sensors for measuring temperatures of respective different locations of the processor. The sensors may estimate the temperatures of a plurality of respective different heat generating blocks of the processor. The number of sensors may be smaller than the number of heat generating blocks.

Another embodiment of the present invention relates to a temperature estimation method. This method comprises: acquiring, in advance, information on a correspondence between a temperature of a certain block of a processor detected by a sensor and temperatures of a plurality of heat generating blocks of the processor for situations where a load is applied to the processor; and estimating the temperatures of the plurality of heat generating blocks from the temperature of the certain block detected by the sensor by referring to the information on the correspondence.

Still another embodiment of the present invention also relates to a temperature estimation method. This method comprises: estimating a maximum temperature of a processor from a temperature of a certain block of the processor detected by a sensor, based on a difference between the detected temperature and a temperature of a heat generating block of the processor for situations where a maximum load is applied to the processor, if an amount of heat generation of the entire processor is relatively large; and estimating the maximum temperature of the processor from the temperature of the certain block detected by the sensor, based on a difference between the detected temperature and the temperature of the heat generating block for situations where a load is applied to the heat generating block selectively, if the amount of heat generation is relatively small.

Still another embodiment of the present invention also relates to a temperature estimation method. This method comprises: applying a random load to a processor; measuring differences between a temperature of a certain block of the processor detected by a sensor and temperatures of a plurality of heat generating blocks of the processor; determining estimation errors in estimating the temperatures of the plurality of heat generating blocks from the detected temperature; and adjusting a position of the certain block for the sensor to detect the temperature thereof, so that the estimation errors become relatively smaller.

Still another embodiment of the present invention relates to a processor system. This processor system includes: a sensor which measures a temperature of a certain block of a processor; and a temperature estimation unit which estimates temperatures of a plurality of heat generating blocks of the processor based on the temperature of the certain block detected by the sensor. The processor system may include the processor and a memory so that the processor is provided with the temperature estimation unit and the memory may contain information on differences in temperature between the plurality of heat generating blocks and the certain block for situations where a load is applied to the processor.

Incidentally, any combinations of the foregoing components, and any conversions of expressions of the present invention between methods, apparatuses, systems, recording media, computer programs, and the like are also intended to constitute applicable aspects of the present invention.

BRIEF DESCRIPTION OF THE DRAWINGS

FIGS. 5A to 5C are charts showing the relationship between the sensor temperature and the temperatures of the hot spots under an individual load;

DETAILED DESCRIPTION OF THE INVENTION

Figure 1:
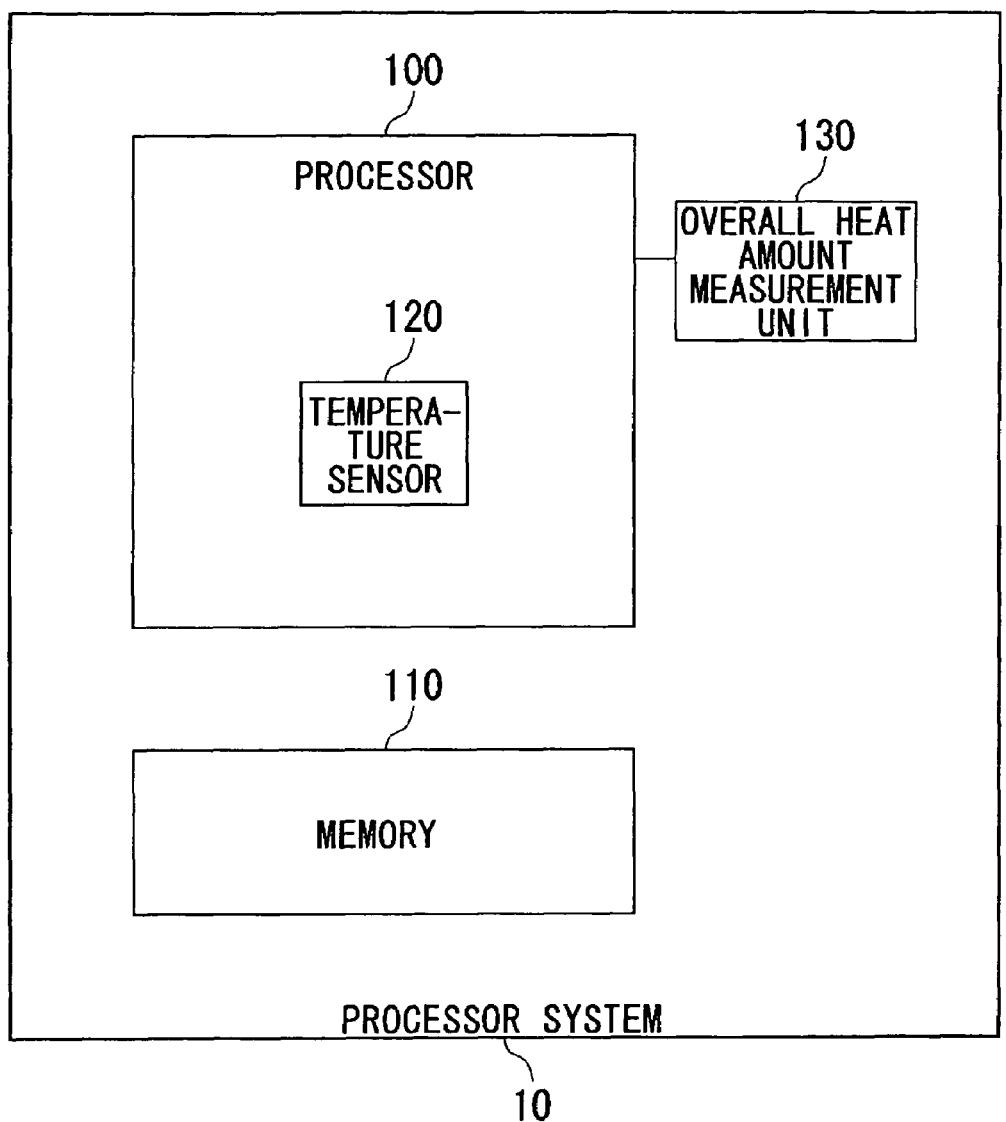
FIG. 1 is a block diagram of a processor system according to an embodiment.

FIG. 1 is a block diagram of a processor system 10 according to an embodiment of the invention. The processor system 10 includes a processor 100 and a memory 110, which are connected with a bus. The processor 100 is provided with a temperature sensor 120 for measuring the temperature inside the device. The temperature sensor 120 is formed directly on the die on the top of the package of the processor 100, and measures the temperature of a certain location inside the processor 100.

An overall heat amount measurement unit 130 is formed outside the processor 100, and measures the overall amount of heat of the processor 100. The overall heat amount measurement unit 130 is a temperature sensor which uses a heat sink or the like of the processor 100. When a heat sink or other component having an extremely high heat capacity is placed on the chip, it is possible to measure the average amount of heat of the processor 100. To measure the amount of heat of the processor 100 more accurately, the power consumption of the processor 100 may be measured.

Figure 2:
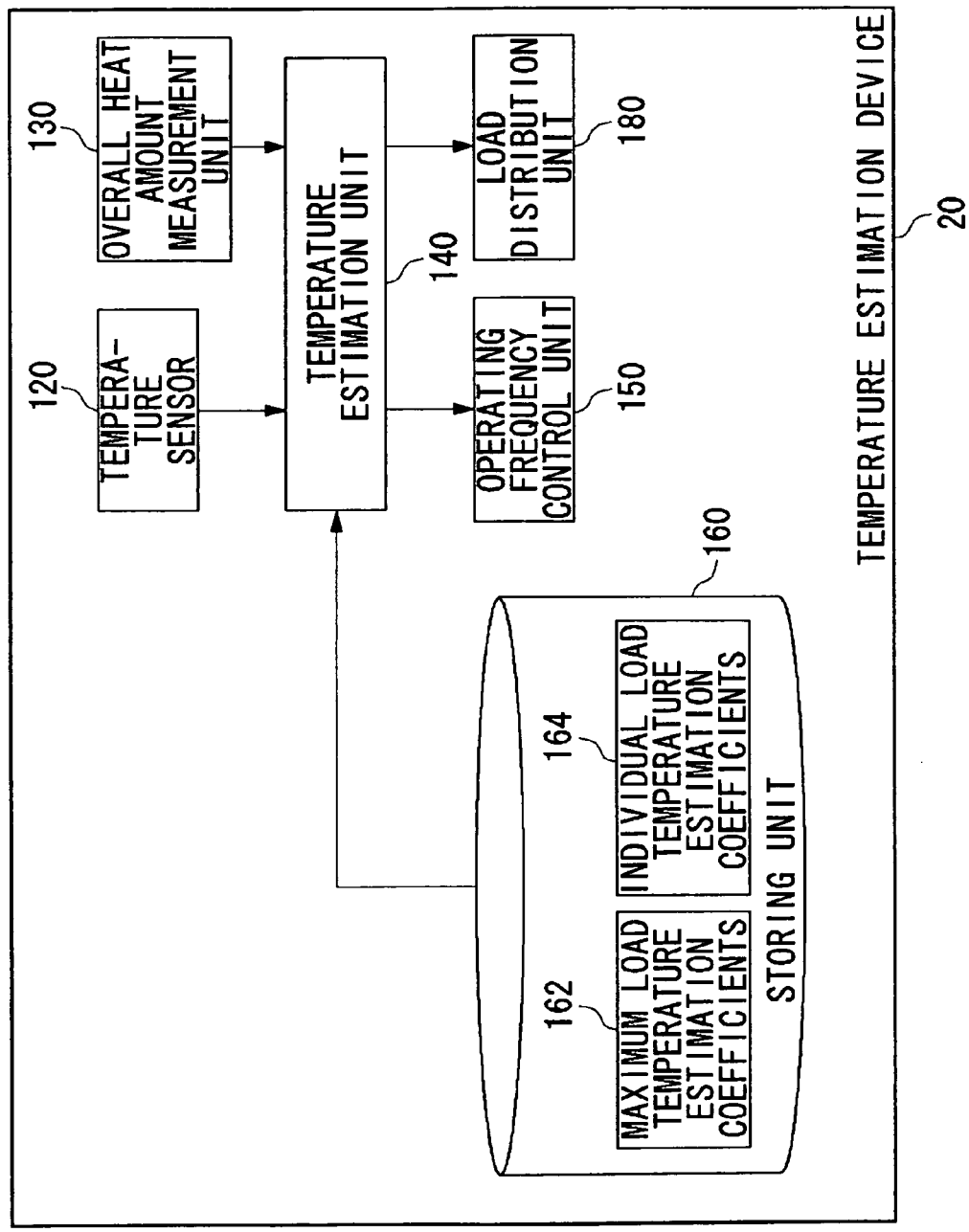
FIG. 2 is a block diagram of a temperature estimation device according to the embodiment.

FIG. 2 is a block diagram of a temperature estimation device 20 according to the embodiment. The functional blocks of the temperature estimation device 20 are realized by cooperation of the processor 100 and the memory 110 of FIG. 1, and software loaded into the memory 110. It will thus be understood by those skilled in the art that these functional blocks may be achieved in various forms, including hardware alone, software alone, and a combination of these.

A temperature estimation unit 140 receives data on the temperature of the certain location inside the processor 100, measured by the temperature sensor 120, and data on the overall amount of heat of the processor 100, measured by the overall heat amount measurement unit 130. Then, the temperature estimation unit 140 estimates the temperatures of a plurality of hot spots occurring on the processor 100 based on those pieces of data, and estimates a maximum temperature of the processor 100 from the temperatures of the plurality of hot spots. To determine the temperatures of the hot spots, the temperature estimation unit 140 switches between maximum load temperature estimation coefficients 162 and individual load temperature estimation coefficients 162 stored in a storing unit 160 for reference, depending on the overall amount of heat of the processor 100. The coefficients referred to are applied to a temperature estimation function(s) for converting the temperature of the certain location detected by the temperature sensor 120 into the temperatures of the hot spots.

The storing unit 160 may be implemented in the memory 110 of the processor system 10 shown in FIG. 1, or may be implemented in an internal cache memory of the processor 100.

An operating frequency control unit 150 exercises control for lowering the operating frequency of the processor 100 when the maximum temperature of the processor 100 estimated by the temperature estimation unit 140 exceeds a predetermined limit temperature.

Figures 3A, 3B, 4:
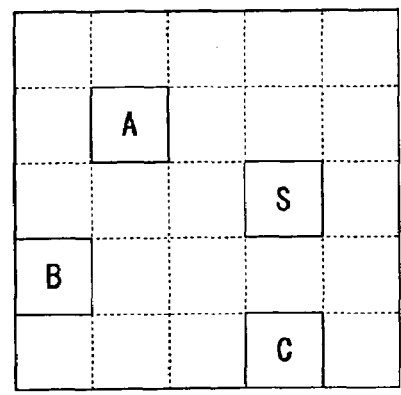
FIGS. 3A and 3B are diagrams for explaining the physical relationship between hot spots of the processor of FIG. 1 and a temperature sensor.
FIG. 4 is a chart showing the relationship between the sensor temperature and the maximum temperature of the processor under a maximum load.

FIGS. 3A and 3B are diagrams for explaining the physical relationship between the hot spots of the processor 100 and the temperature sensor 120. The entire chip area of the processor 100 is sectioned into small areas as shown in FIG. 3A. These small areas will be referred to as operation blocks.

Each operation block includes a single transistor or a group of a certain number of transistors for constituting the chip. The operation blocks are sectioned in sizes of areas in which spot-like peaks of heat generation occur. Nevertheless, the sizes of the operation blocks may be determined freely according to such factors as a target accuracy of the temperature estimation. Moreover, the operation blocks may be either sectioned in an identical size systematically or sectioned irregularly along the boundaries of various operation units.

To identify the locations of potential hot spots on the processor 100, the temperature distribution over the processor 100 is measured with a maximum load applied to the processor 100. FIG. 3A shows an example of the temperature distribution over the processor 100. The numeric values in the operation blocks indicate the temperatures of the respective operation blocks. The three operation blocks shown hatched in the diagram reach a maximum temperature of 85° C., so that these operation blocks are identified as hot spots. The operation block having the encircled temperature value shows the position where the temperature sensor 120 is installed. That is, the temperature sensor 120 detects the temperature of this operation block, i.e., 60° C.

FIG. 3B is a diagram corresponding to FIG. 3A, showing the positions of the three hot spots, or operation blocks A, B, and C, and the position of an operation block S where the temperature sensor 120 is installed. The temperature detected by the temperature sensor 120 installed on the operation block S (hereinafter, referred to simply as sensor temperature) will be denoted as $T_S$. The temperatures of the hot spots A, B, and C will be denoted as $T_A$, $T_B$, and $T_C$, respectively. The temperature sensor 120 is preferably installed in a position best suited to measuring the temperatures of the hot spots A, B, and C under a maximum load. For example, in consideration of a position at equal distances from the three hot spots A, B, and C, and the temperature distribution and circuit configuration of the entire processor 100, the temperature sensor 120 is placed in a position where the temperatures of the respective hot spots A, B, and C can be measured with equal accuracies.

The temperature estimation unit 140 estimates the temperatures $T_A$, $T_B$, and $T_C$ of the respective hot spots A, B, and C from the detected sensor temperature $T_S$ indirectly. For accurate temperature estimation, a temperature estimation function is determined in advance through simulations of applying a maximum load to the entire processor 100 and applying loads to around the potential hot spots or operation blocks selectively.

FIG. 4 is a chart showing the relationship between the sensor temperature $T_S$ and the maximum temperature of the processor 100 under a maximum load. In a simulation of a task for applying a maximum load to the entire processor 100, differences between the temperatures $T_A$, $T_B$, and $T_C$ of the hot spots A, B, and C and the sensor temperature $T_S$ (hereinafter, referred to simply as temperature differences) $\Delta T_A$, $\Delta T_B$, and $\Delta T_C$ are 23° C., 25° C., and 24° C., respectively, when the sensor temperature $T_S$ is 50° C. Here, the maximum temperature of the processor 100 is the temperature of the hot spot B, or 75° C.

Now, when the sensor temperature $T_S$ reaches 55° C., the temperature differences $\Delta T_A$, $\Delta T_B$, and $\Delta T_C$ of the hot spots A, B, and C are 25° C., 24° C., and 22° C., respectively. Here, the maximum temperature of the processor 100 is the temperature of the hot spot A, or 80° C. Moreover, when the sensor temperature $T_S$ rises to 60° C., all the temperature differences $\Delta T_A$, $\Delta T_B$, and $\Delta T_C$ of the hot spots A, B, and C are 25° C. The maximum temperature of the processor 10 is the temperature of the hot spots A, B, and C, or 85° C.

Based on the measurements of FIG. 4, the temperature estimation unit 140 determines a temperature estimation function for estimating the temperatures $T_A$, $T_B$, and $T_C$ of the hot spots from the sensor temperature $T_S$ when under a maximum load. The temperatures of the hot spots under a maximum load are basically determined by adding the temperature differences to the sensor temperature. In a more general sense, however, the temperatures of the hot spots may be considered as a function of the sensor temperature. An example of the temperature estimation function is the following linear function:

$$T_i = a_M T_S + b_M,$$

where i represents any one of the hot spots A, B, and C. Based on the measurements of FIG. 4, the coefficients $a_M$ and $b_M$ of the temperature estimation function under a maximum load can be approximated as $a_M=1$ and $b_M=25$.

The coefficients $a_M$ and $b_M$ obtained thus are stored into the storing unit 160 as maximum load temperature estimation coefficients 162. The temperature estimation unit 140 applies the sensor temperature $T_S$ to the temperature estimation function, using the maximum load temperature estimation coefficients 162 stored in the storing unit 160, thereby determining the temperatures $T_A$, $T_B$, and $T_C$ of the respective hot spots A, B, and C under a maximum load.

FIGS. 5A to 5C are charts for showing the relationships between the sensor temperature $T_S$ and the temperatures $T_A$, $T_B$, and $T_C$ of the hot spots A, B, and C when under an individual load. FIG. 5A shows the relationship between the sensor temperature $T_S$ and the temperature $T_A$ of the hot spot A in a simulation of a task where the operation block of the hot spot A undergoes an intensive load. Here, the other hot spots B and C undergo no load or a relatively small load if any.

When the hot spot A is subjected to an individual load and the sensor temperature $T_S$ reaches 50° C., the temperature $T_A$ of the hot spot A is 65° C. At a sensor temperature $T_S$ of 60° C., the temperature $T_A$ of the hot spot A is 75° C. At a sensor temperature $T_S$ of 70° C., the temperature $T_A$ of the hot spot A is 85° C. From this relationship, it is shown that the temperature difference $\Delta T_A$ between the temperature $T_A$ of the hot spot A and the sensor temperature $T_S$ under an individual load is 15° C.

Based on the measurements of FIG. 5A, the temperature estimation unit 140 approximates a temperature estimation function for estimating the temperature $T_A$ of the hot spot A from the sensor temperature $T_S$ under an individual load, by the following linear function:

$$T_A = a_m T_s + b_m.$$

Here, based on the measurements of FIG. 5A, the coefficients $a_m$ and $b_m$ of the temperature estimation function under an individual load can be determined as $a_m=1$ and $b_m=15$. The coefficients $a_m$ and $b_m$ obtained thus are stored into the storing unit 160 as individual load temperature estimation coefficients 164.

Similarly, FIG. 5B is a chart for showing the relationship between the sensor temperature $T_S$ and the temperature $T_B$ of the hot spot B when an intensive load is applied to the operation block of the hot spot B. From this relationship, a temperature estimation function for estimating the temperature $T_B$ of the hot spot B from the sensor temperature $T_S$ under an individual load is determined by approximation to a linear function or the like. The resulting coefficients are stored into the storing unit 160 as individual load temperature estimation coefficients 164. Similarly, FIG. 5C is a chart for showing the relationship between the sensor temperature $T_S$ and the temperature $T_C$ of the hot spot C when an intensive load is applied to the operation block of the hot spot C. From this relationship, a temperature estimation function for estimating the temperature $T_C$ of the hot spot C from the sensor temperature $T_S$ under an individual load is determined. The resulting coefficients are stored into the storing unit 160 as individual load temperature estimation coefficients 164.

As a result, the storing unit 160 contains the individual load temperature estimation coefficients 164 with respect to each of the hot spots. The temperature estimation unit 140 applies the sensor temperature $T_S$ to the temperature estimation functions using the individual load temperature estimation coefficients 164 stored in the storing unit 160, thereby determining the temperatures $T_A$, $T_B$, and $T_C$ of the respective hot spots A, B, and C under an individual load.

Instead of determining the temperature estimation functions, a table containing the values of the temperatures $T_A$, $T_B$, and $T_C$ of the respective hot spots A, B, and C with respect to the value of the sensor temperature $T_S$ as shown in FIGS. 5A to 5C may be stored into the storing unit 160. In this case, the temperature estimation unit 140 can acquire the values of the temperatures $T_A$, $T_B$, and $T_C$ of the respective hot spots A, B, and C corresponding to a value of the sensor temperature $T_S$ by consulting the table.

Figure 6:
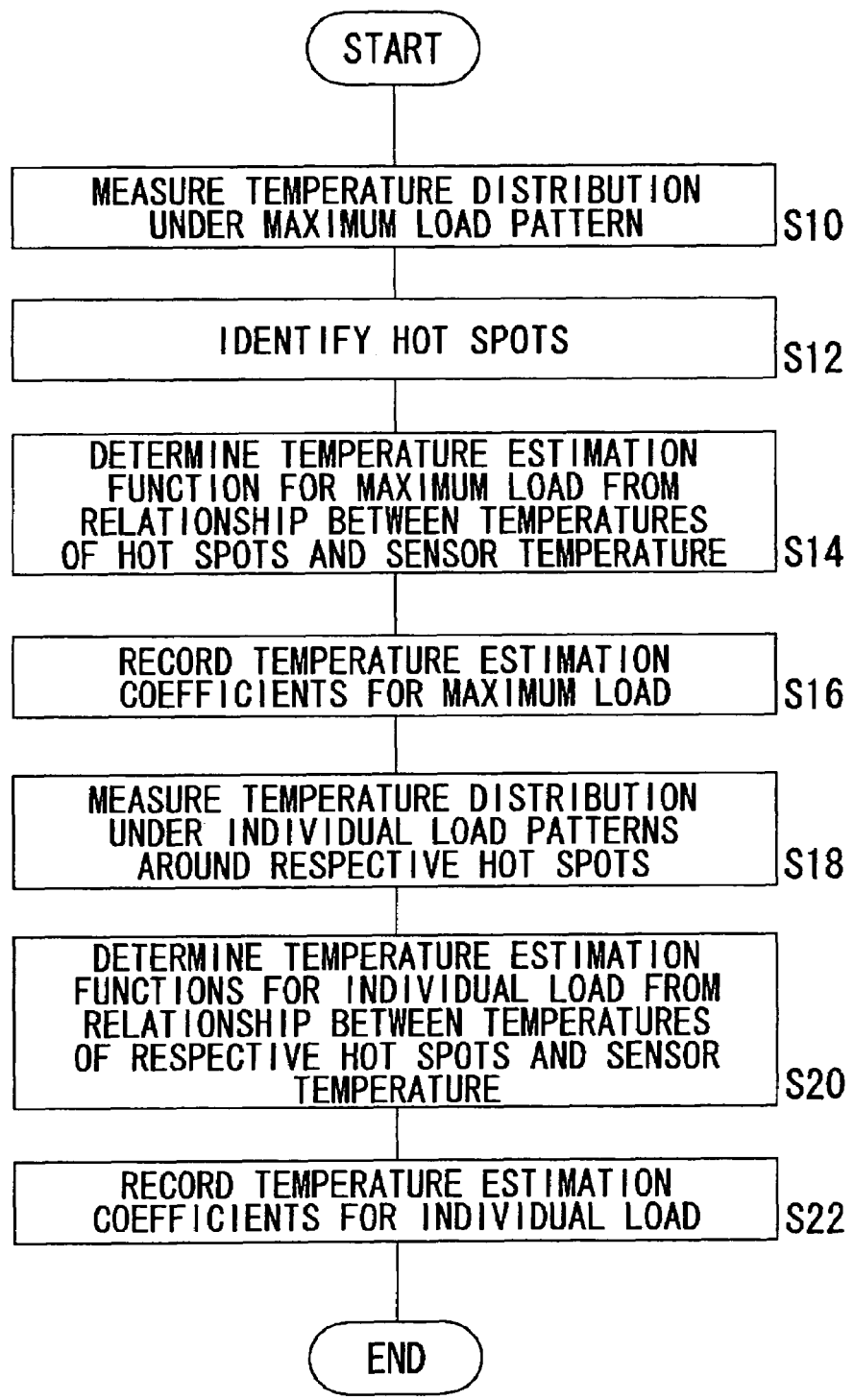
FIG. 6 is a flowchart for explaining the procedure by which a temperature estimation unit of FIG. 2 acquires temperature estimation coefficients.

FIG. 6 is a flowchart for explaining the procedure by which the temperature estimation unit 140 acquires the temperature estimation coefficients.

Initially, a maximum load is applied to the processor 100 by using a simulation tool or the like. Under the maximum load pattern, the processor 100 is measured for temperature distribution (S10). The temperature distribution of the processor 100 is obtained by detecting the temperatures of the individual operation blocks of the processor 100. The temperatures of the individual operation blocks may be measured actually. Alternatively, the temperatures of the individual operation blocks may be determined by calculating the amounts of heat generation by using a simulator or the like in designing the circuitry of the processor 100.

A hot spot of the processor 100 is identified from the temperature distribution obtained (S12). As described in FIG. 3A, the hot spot is an operation block that shows the maximum temperature. A plurality of hot spots are identified if a plurality of operation blocks show the maximum temperature. Here, aside from the operation block(s) showing the maximum temperature, the hot spots may also include operation blocks that show the second and third highest temperatures, for example.

The temperature estimation unit 140 determines the temperature estimation function when under a maximum load from the relationship between the temperatures of the hot spots and the sensor temperature (S14). The temperature estimation unit 140 stores the coefficients of the temperature estimation function under a maximum load into the storing unit 160 as the maximum load temperature estimation coefficients 162 (S16). The temperature estimation function is a linear function or a function of higher order for converting the sensor temperature into the temperatures of the hot spots.

Next, each of the hot spots identified at step S12 is subjected to an intensive load by using a simulation tool or the like, and the processor 100 is measured for temperature distribution under an individual load pattern around each hot spot (S18). In measuring the temperature distribution under an individual load, all the operation blocks of the processor 100 need not be measured for temperature. It is only necessary that at least the operation block of the hot spot under the intensive load be measured for temperature.

The temperature estimation unit 140 determines the temperature estimation functions as to the respective hot spots under an individual load, from the relationships between the temperatures of the respective hot spots and the sensor temperature (S20). For each of the hot spots, the temperature estimation unit 140 stores the coefficients of the temperature estimation function under an individual load into the storing unit 160 as the individual load temperature estimation coefficients 164 (S22).

Figure 7:
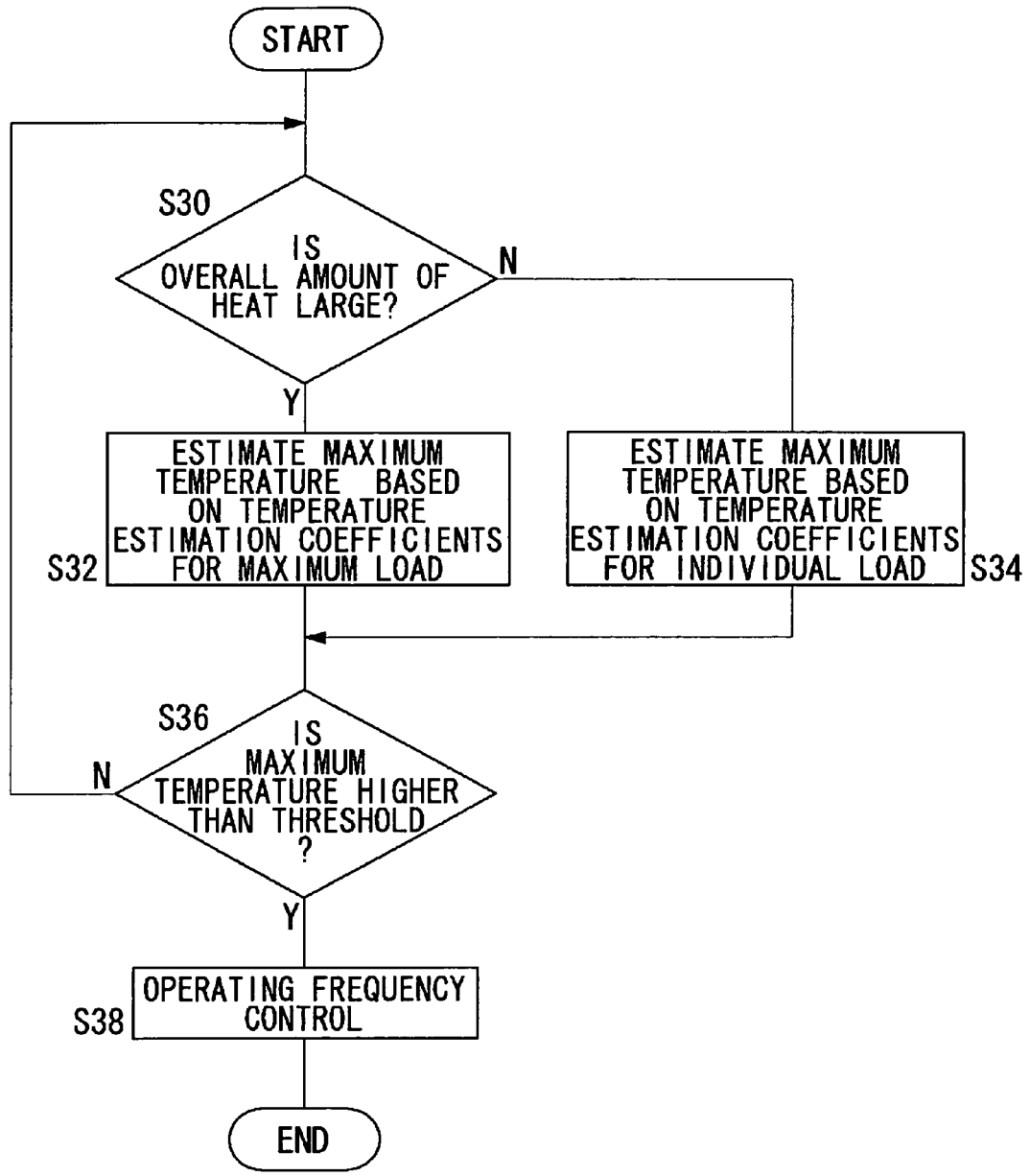
FIG. 7 is a flowchart for explaining the procedure by which the temperature estimation unit of FIG. 2 estimates temperatures.

FIG. 7 is a flowchart for explaining the procedure by the temperature estimation unit 140 estimates temperatures.

The overall heat amount measurement unit 130 measures the overall amount of heat of the processor 100, and determines whether the overall amount of heat is large or small (S30). If the overall amount of heat is larger than a predetermined threshold (Y at S30), the temperature estimation unit 140 refers to the maximum load temperature estimation coefficients 162 stored in the storing unit 160. The temperature estimation unit 140 then estimates the maximum temperature of the processor 100 by using the temperature estimation function for a maximum load (S32).

When the overall amount of heat is large, a number of operation blocks are under high loads. Although the operation blocks vary in temperature, the temperatures are at a high level on the whole. Thus, despite some differences between the operation blocks, the differences in temperature between the sensor position and the positions where heat generation peaks can be approximated to a difference in temperature between the sensor position and a hot spot under a maximum load. Then, when the overall amount of heat is large, the temperature estimation function for a maximum load is applied to convert the sensor temperature into the temperature of the hot spot. The temperature of the hot spot is used as the estimated maximum temperature of the processor 100. The temperature estimation unit 140 supplies the maximum temperature estimated by using the temperature estimation function for a maximum load, to the operating frequency control unit 150.

If the maximum temperature estimated by the temperature estimation unit 140 is higher than a predetermined threshold (Y at S36), the operating frequency control unit 150 exercises control for lowering the operating frequency of the processor 100 (S38). For example, if the processor 100 has a limit temperature of 85° C., the predetermined threshold is set at 85° C. In the example of FIG. 4, the temperature estimation unit 140 estimates a maximum temperature of 85° C. and the operating frequency control unit 150 exercises control for lowering the operating frequency when the sensor temperature reaches 60° C.

If the maximum temperature estimated by the temperature estimation unit 140 is lower than or equal to the predetermined threshold (N at S36), the operating frequency control unit 150 will not control the operating frequency and the processing returns to step S30.

At step S30, if the overall amount of heat of the processor 100 is smaller than or equal to the predetermined threshold (N at S30), the temperature estimation unit 140 refers to the individual load temperature estimation coefficients 164 stored in the storing unit 160. The temperature estimation unit 140 then estimates the maximum temperature of the processor 100 by using the temperature estimation functions for an individual load (S34).

When the overall amount of heat is small, the load applied to the entire processor 100 is not high, whereas a certain location may undergo an intensive load and possibly become high in temperature locally. That is, the operation blocks can vary greatly in temperature, with a wide range of differences in temperature from the sensor temperature. In such a case, the difference in temperature between the sensor position and the location where heat generation peaks is preferably approximated to a difference in temperature between the sensor position and the hot spot when an intensive load is applied to the hot spot. Thus, if the overall amount of heat is low, the temperature estimation function for an individual load is applied to convert the sensor temperature into the temperature of the hot spot. The temperature of the hot spot is used as the estimated maximum temperature of the processor 100.

If there are a plurality of hot spots, the temperatures of the respective hot spots are determined from the sensor temperature by applying the temperature estimation functions for an individual load, assuming that the hot spots are individually subjected to an intensive load. The highest temperature among the temperatures of the respective hot spots is regarded as the maximum temperature of the processor 100. That is, since it is unknown which of the hot spots is undergoing a load, the maximum temperature of the processor 100 is estimated on the assumption of the worst case.

For example, in the example of FIGS. 5A to 5C, assume that the current sensor temperature is 60° C. and the limit temperature of the processor 100 is 85° C. Provided that the hot spot A is under an intensive load, it is shown from FIG. 5A that the temperature $T_A$ of the hot spot A corresponding to the sensor temperature of 60° C. is 75° C. which is below the limit temperature. Provided that the hot spot B is under the intensive load, it is shown from FIG. 5B that the temperature $T_B$ of the hot spot B is 72° C. which is below the limit temperature again.

Provided that the hot spot C is under the intensive load, however, it is shown from FIG. 5C that the temperature $T_C$ of the hot spot C is 85° C. which reaches the limit temperature. It is unknown which of the hot spots is undergoing the intensive load, whereas the hot spot C may be and reach the limit temperature when the worst case is assumed. If the overall amount of heat of the processor 100 is small, the temperature estimation unit 140 determines the temperatures of the respective hot spots, assuming the cases where the respective hot spots are subjected to an individual load. The temperature estimation unit 140 then selects a hot spot of the highest temperature, and regards the temperature of that hot spot as the maximum temperature of the processor 100.

The temperature estimation unit 140 supplies the maximum temperature estimated as described above by using the temperature estimation functions for an individual load, to the operating frequency control unit 150. As is the case with a maximum load, the operating frequency control unit 150 performs the processing of steps S36 and S38.

According to the temperature estimation device 20 of the present embodiment, hot spots of the processor 100 are identified by simulations or experiments so that information as to differences between the temperature detected by the temperature sensor 120 and the temperatures of the hot spots is stored in advance. This makes it possible to estimate the maximum temperature of the processor 100 from the temperature-detected by the temperature sensor 120 with a simple configuration.

When the heat flux of the entire chip, i.e., the amount of heat generated per unit area increases due to powerful cooling mechanisms such as a heat sink, it becomes easier for any type of chip to cause local hot spots. It follows that a plurality of hot spots occur in places. According to the temperature estimation device 20 of the present embodiment, the maximum temperature of the processor 100 can be estimated from the sensor temperature by using the temperature estimation functions corresponding to a plurality of hot spots. It is therefore possible to suppress the number of temperature sensors 120 to be installed, thereby allowing a reduction in the manufacturing cost of the processor 100.

Moreover, in the temperature estimation method of the processor 100 using the temperature estimation device 20 of the present embodiment, the temperature estimation coefficients for a maximum load and the temperature estimation coefficients for an individual load are switched depending on the overall amount of heat of the processor 100. Then, the temperatures of the hot spots are determined from the sensor temperature, and the maximum temperature of the processor 100 is estimated. When the overall amount of heat is small, the use of the temperature estimation coefficients for a maximum load may sometimes cause overestimation of the maximum temperature with considerable errors. According to the temperature estimation method of the present embodiment, the temperature estimation coefficients for an individual load can be used to suppress the errors when the overall amount of heat is small.

The foregoing description has dealt with the case where the coefficients of the temperature estimation functions for a maximum load and for an individual load are fixed to values determined by simulations. Nevertheless, these coefficients may be changed dynamically depending on the load on the processor 100.

Figure 8:
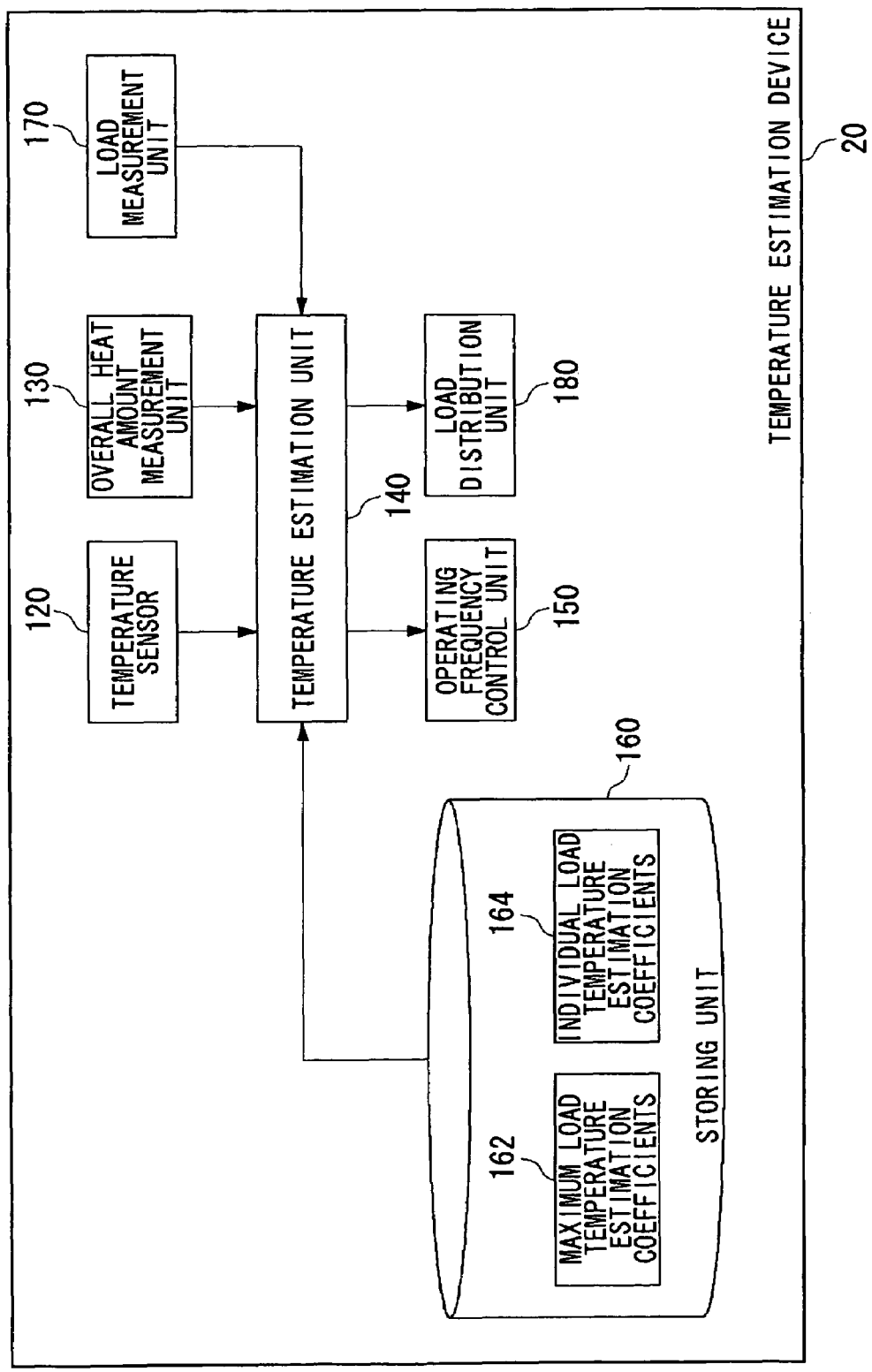
FIG. 8 is a block diagram of the temperature estimation device for the case of adjusting temperature estimation coefficients dynamically.

FIG. 8 is a block diagram of the temperature estimation device 20 for the case of adjusting the temperature estimation coefficients dynamically. The temperature estimation device 20 has a load measurement unit 170 aside from the configuration of FIG. 2.

The load measurement unit 170 monitors instructions and tasks run on the processor 100 by hardware or software means, thereby measuring in real time the operating loads on the operation blocks corresponding to respective hot spots of the processor 100. The load measurement unit 170 then supplies the load information on each hot spot to the temperature estimation unit 140.

Based on the load information on each hot spot supplied from the load measurement unit 170, the temperature estimation unit 140 adjusts the coefficients of the temperature estimation functions for a maximum load and an individual load. Specifically, when a temperature estimation function is a linear function $T_i=aT_S+b$, the temperature estimation coefficients a and b are regarded as functions of a load $\alpha$. The temperature estimation coefficients a and b are then adjusted depending on the load $\alpha$. For example, if the load $\alpha$ is low, the temperature estimation coefficients a and b are corrected to smaller values so as to avoid overestimation at the time of temperature estimation. If the load $\alpha$ is high, the temperature estimation coefficients a and b are corrected to greater values so as to avoid the possibility that the maximum temperature of the processor 100 be estimated below its actual value.

Aside from the load information on the hot spots supplied from the load measurement unit 170, the temperature estimation unit 140 may also estimate the amounts of heat generated at the hot spots by referring to the operating frequency, the power supply voltage, etc. The temperature estimation coefficients are then adjusted based on the amounts of heat generation estimated.

The dynamic adjustment of the temperature estimation coefficients may be applied to either one or both of the temperature estimation function for a maximum load and the temperature estimation functions for an individual load. Due to the dynamic adjustment of the temperature estimation coefficients, the temperature estimation functions change from stationary into non-stationary functions. The sensor output is thus corrected depending on the load condition. It is therefore possible to reflect individual load conditions upon a reference temperature that is estimated from the sensor temperature based on the overall amount of heat of the processor 100, so that the maximum temperature of the processor 100 can be estimated with a higher degree of accuracy.

The foregoing description has dealt with the case where the temperature sensor 120 is installed in a position where the temperatures of the hot spots can be measured evenly when under a maximum load. When there are a plurality of hot spots, it is typically desirable that the temperature sensor 120 can detect the temperatures of the respective hot spots with equal accuracies. The reason is that if the temperature sensor 120 is placed close to a certain hot spot and away from the others, the temperature of the hot spot lying nearby can be detected with a high degree of accuracy while the temperatures of the hot spots lying far tend to drop in the accuracy of measurement.

The physical relationship between the temperature sensor 120 and the hot spots is preferably optimized not only to the maximum load pattern but also to other load patterns. For that purpose, load conditions are changed randomly to give various load patterns to the processor 100 while determining a position where the sensor temperature moves with the temperatures of the respective hot spots the most stably, or equivalently, a position the least susceptible to variations in the temperatures of the hot spots. The temperature sensor 120 is then placed in that position.

Figure 9:
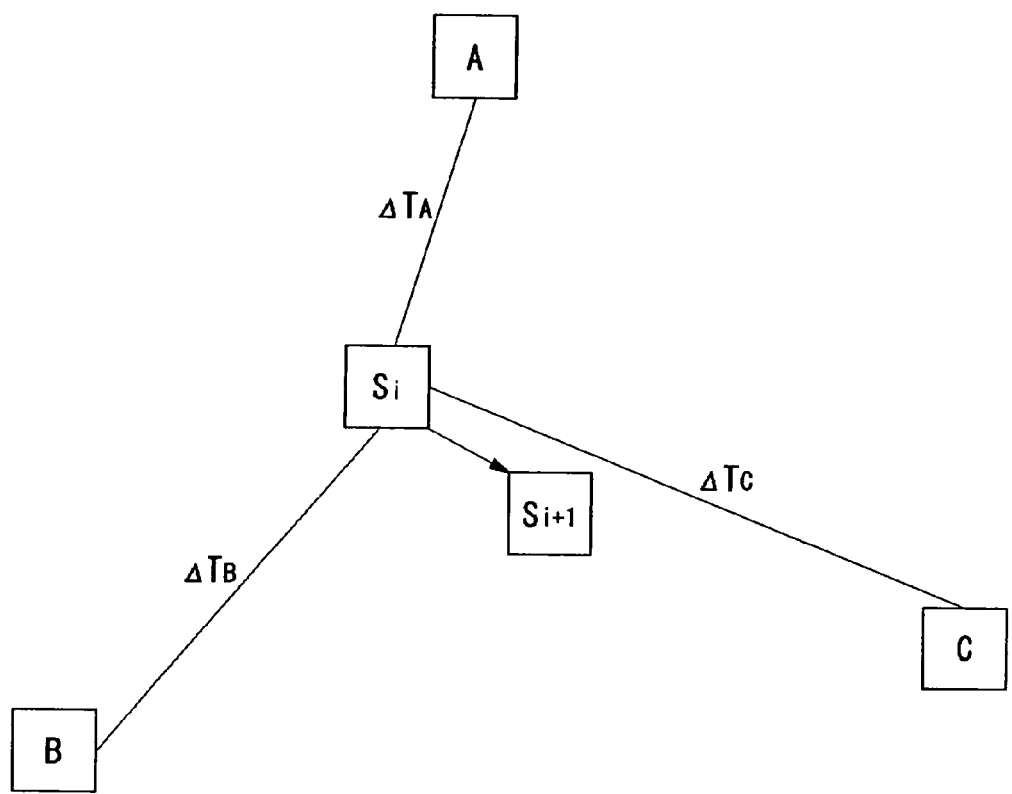
FIG. 9 is a diagram showing how to adjust the installation position of the temperature sensor.

FIG. 9 shows how to adjust the installation position of the temperature sensor 120. The processor 100 is subjected to random loads, and the position of the temperature sensor 120 is adjusted successively by learning. Suppose, for example, that the ith position of the temperature sensor 120 falls on the position $S_i$ in the diagram. Here, differences $\Delta T_A$, $\Delta T_B$, and $\Delta T_C$ between the sensor temperature $T_S$ and the temperatures $T_A$, $T_B$, and $T_C$ of the respective hot spots A, B, and C shall have some variations in value. For example, when the sensor temperature $T_S$ is 60° C., and $\Delta T_A$=10° C., $\Delta T_B$=5° C., and $\Delta T_C$=20° C., the sensitivity of temperature measurement on the hot spot C is desirably increased by making the sensor position closer to the hot spot C. Then, the temperature sensor 120 is shifted in position from $S_i$ to $S_{i+1}$, closer to the hot spot C.

Figure 10:
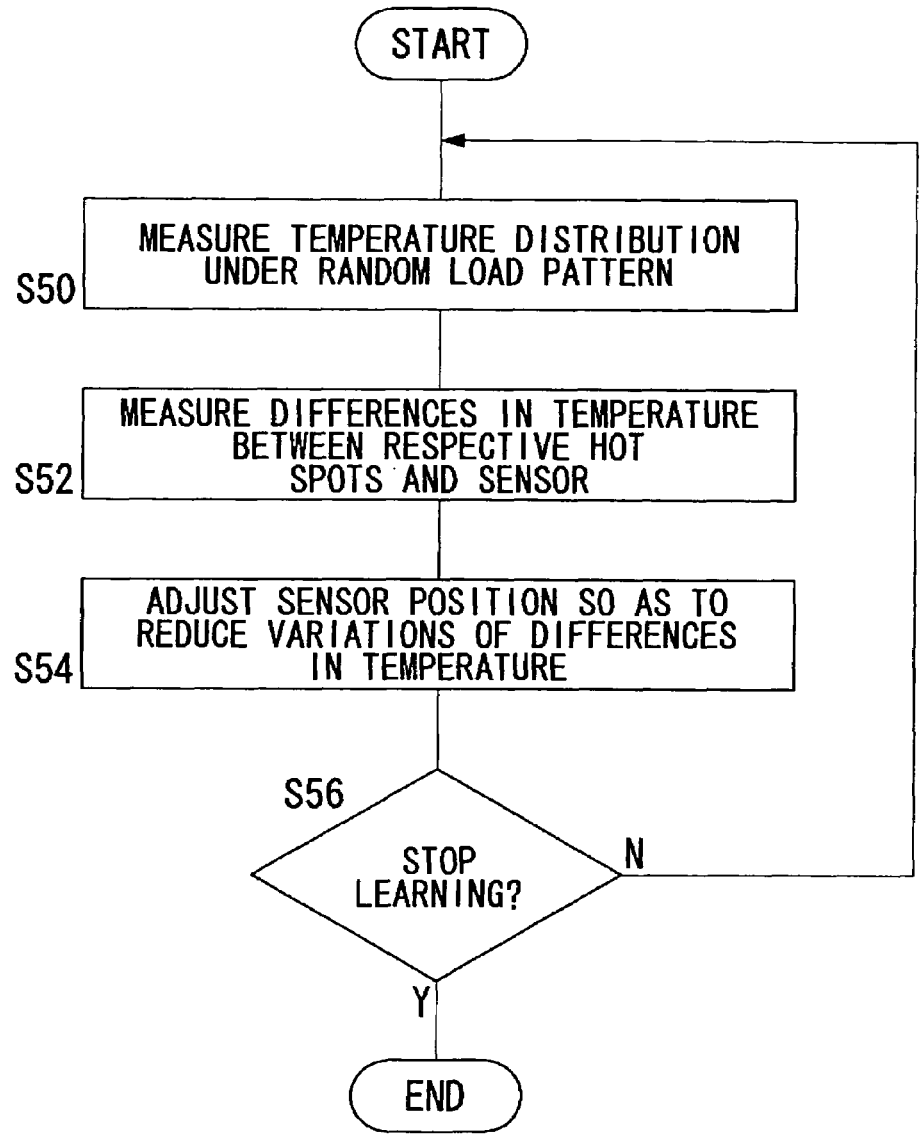
FIG. 10 is a flowchart for explaining the procedure for learning the installation position of the temperature sensor.

FIG. 10 is a flowchart for explaining the procedure for learning the installation position of the temperature sensor 120. A random load is applied to the processor 100, and the processor 100 is measured for temperature distribution under that load pattern (S50). From the measurement of the temperature distribution, the temperatures of the plurality of hot spots and the sensor temperature of the temperature sensor 120 at the current installation position are obtained.

Differences between the temperatures of the respective hot spots and the sensor temperature are measured (S52). The position of the temperature sensor 120 is adjusted so that variations of the differences in temperature between the respective hot spots and the sensor decrease (S54). This sensor position adjustment is effected by shifting the sensor position to such a direction that the differences in temperature between the respective hot spots and the sensor become uniform.

If the learning of the sensor position is stopped (Y at S56), the current position of the temperature sensor 120 is regarded as the optimum position and the processing is terminated. If the learning of the sensor position is not stopped (N at S56), the processing returns to step S50 so that a random load pattern is applied again to repeat the adjustment of the sensor position.

The sensor position is thus optimized by applying random loads repeatedly. Consequently, even when any one of the hot spots reaches a limit temperature under an unknown load pattern, it can be surely estimated from the temperature detected by the temperature sensor 120 that the processor 100 reaches the limit temperature. This can further reduce errors in estimating the maximum temperature of the processor 100 ascribable to such factors as load fluctuations and variations of temperature distribution on the chip, thereby allowing an improvement to the accuracy of temperature estimation.

Figure 11:
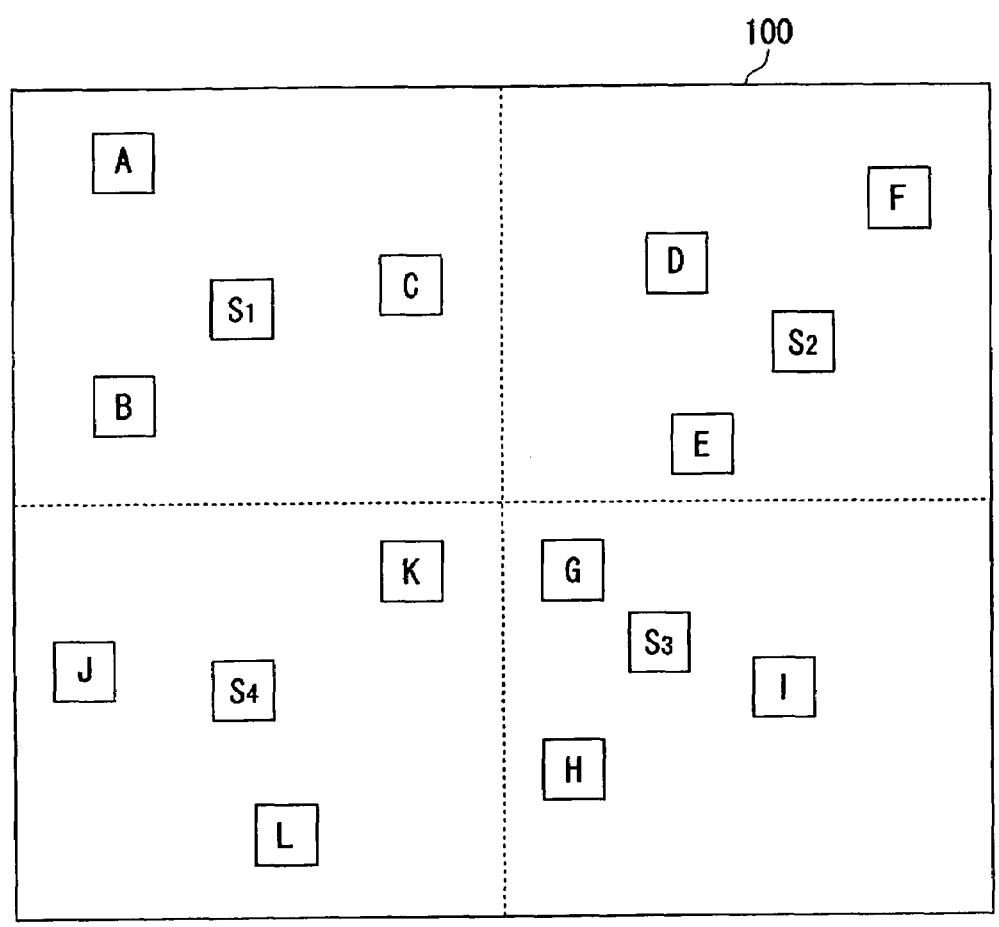
FIG. 11 is a diagram for explaining the physical relationship between hot spots of the processor of FIG. 1 and a plurality of temperature sensors.

The foregoing description has dealt with the case where a single temperature sensor 120 is formed on the processor 100. Nevertheless, the processor 100 may be provided with a plurality of temperature sensors 120. FIG. 11 is a diagram for explaining the physical relationship between hot spots of the processor 100 and a plurality of temperature sensors 120. As shown in the diagram, the processor 100 is divided into four major areas, in each of which potential hot spots or operation blocks are identified. A temperature sensor 102 for estimating the temperatures of the hot spots is formed in each area.

The temperatures of the hot spots A to C are estimated by a temperature sensor that is installed in the sensor position $S_1$. The sensor position $S_1$ may be one optimized by the learning procedure described previously. Similarly, the temperatures of the hot spots D to F are estimated by a temperature sensor installed in the sensor position $S_2$. The temperatures of the hot spots G to I are estimated by a temperature sensor installed in the sensor position $S_3$. The temperatures of the hot spots J to L are estimated by a temperature sensor installed in the sensor position $S_4$.

The number and positions of temperature sensors 120 to install may be designed freely depending on the number of hot spots of the processor 100 and the distribution of the hot spots, and may be determined by experiments or simulations. Even if there are a number of hot spots, the hot spots can be grouped so that temperature sensors 120 in charge of temperature detection of the hot spots are allocated for the respective groups. This makes it possible to estimate the maximum temperature of the processor 100 with a smaller number of temperature sensors 120, thereby allowing a reduction in the manufacturing cost.

Up to this point, the present invention has been described in conjunction with the embodiment thereof. This embodiment has been given solely by way of illustration. It will be understood by those skilled in the art that various modifications may be made to combinations of the foregoing components and processes, and all such modifications are also intended to fall within the scope of the present invention. Such modifications will be described below.

The embodiment has dealt with the case where the processor system 10 contains a single processor 100, and temperatures are estimated of the hot spots of the processor 100. With a multiprocessor system containing a plurality of processor modules such as a main processor and a sub processor, temperatures may be estimated of the hot spots of each of the modules including the main processor and the sub processor, in order to control heat generation of the entire multiprocessor system.

The embodiment has dealt with the case where the control for lowering the operating frequency of the processor 100 is exercised when the maximum temperature of the processor 100 exceeds a predetermined threshold. Nevertheless, the measures against heat generation may use other techniques. For example, when the overall amount of heat of the processor 100 is small, and an intensive load on certain locations makes certain operation blocks high in temperature, tasks may be allocated to other operation blocks for the sake of load distribution. In this case, as shown in FIGS. 2 and 8, the temperature estimation device 20 is provided with a load distribution unit 180 further. The load distribution unit 180 allocates the load among a plurality of operation blocks to make the heat generation of the processor uniform, depending on the conditions of the heat generation of the operation blocks. The load allocation may be performed in units of tasks, or in finer units of instructions. Incidentally, the load distribution unit 180 may be formed instead of the operating frequency control unit 150 or aside from the operating frequency control unit 150. When the operating frequency control unit 150 and the load distribution unit 180 both are formed, it is even possible to perform either of the operating frequency control and the load distribution selectively or both the operating frequency control and the load distribution in combination depending on the situation.

Figure 12:
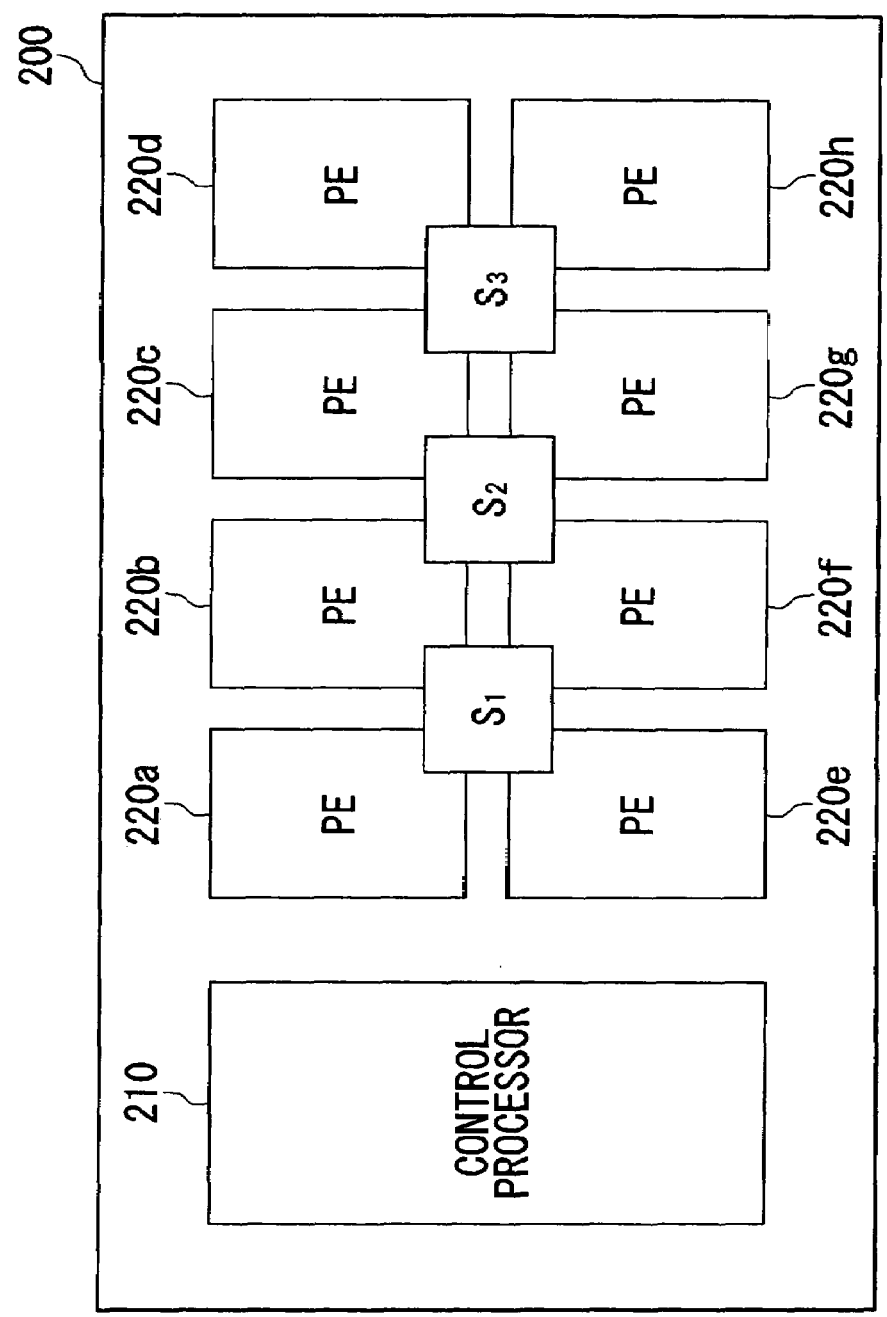
FIG. 12 is a diagram for explaining the configuration of a multiprocessor system of heterogeneous type and the installation positions of temperature sensors.

This load distribution against heat generation is particularly effective for multiprocessor systems having a plurality of processors. Since the load distribution unit 180 allocates a load among the plurality of processors, it is possible to prevent the load from concentrating on a certain processor to generate heat beyond the limit temperature. Multiprocessor systems may be classified into two types: a homogenous type which contains a plurality of processor elements of the same model; and a heterogeneous type which contains a plurality of processor elements of the same model and a control processor as well. FIG. 12 is a diagram for explaining the configuration of a multiprocessor system 200 of heterogeneous type and the installation positions of temperature sensors. A control processor 210 has the function and configuration of the temperature estimation device 20 shown in FIG. 2 or 8, and estimates the temperatures of eight processor elements 220a to 220h. As shown in the diagram, three temperature sensors are installed in sensor positions $S_1$, $S_2$, and $S_3$ near the boundaries of the eight processor elements 220a to 220h. The temperature estimation unit 140 of the temperature estimation device 20 acquires temperature measurement data from the individual temperature sensors. The load distribution unit 180 of the temperature estimation device 20 allocates a load among the eight processor elements 220a to 220h based on the result of temperature estimation by the temperature estimation unit 140. Note that the number of temperature sensors and the installation positions thereof are shown solely by way of illustration. The temperature sensors may be increased in number or installed in different positions.

With a multiprocessor system of homogenous type, any one processor element out of a plurality of processor elements of the same model may have the function and configuration of the temperature estimation device 20. Here, the one processor element performs temperature estimation and load distribution on itself and on the rest of the processor elements as well. Moreover, in a multiprocessor system of homogenous type, all the processor elements of the same model may have the function and configuration of the temperature estimation device 20 so that each individual processor element performs temperature estimation and load distribution independently inside. Similarly, even when the function and configuration of the temperature estimation device 20 are achieved by means of software, a single processor element may perform the function of temperature estimation and load distribution on itself and on the rest of the processor elements by means of software processing. Otherwise, all the processor elements may perform the function of temperature estimation and load distribution independent of each other by means of software processing.

Even with multiprocessor systems, the measures against heat generation may involve an operating frequency control instead of load distribution or aside from load distribution. In that case, the operating frequency control unit 150 of the temperature estimation device 20 may exercise control for lowering the operating frequencies of all the processor elements simultaneously. Alternatively, if the plurality of processor elements are capable of being controlled in the operating frequency independent of each other, the operating frequency control unit 150 may exercise control for lowering the operating frequency of at least one(s) of the processor elements from which hot spots are detected.

For other measures against heat generation, cooling nozzles may be used to cool hot spots or operation blocks locally. Such a pinpoint heat-dissipation control is effective when the overall amount of heat of the processor 100 is small and certain locations alone generate heat locally. In another configuration, emergency procedure of lowering the power supply voltage of the processor system 10 may be taken.

The embodiment has dealt with the case where the processing for estimating the temperatures of the hot spots of the processor 100 is performed by the processor 100 itself. Nevertheless, the processing for estimating the temperatures may be performed outside the processor 100 based on the output of the temperature sensor 120. The configuration of the temperature estimation device 20 shown in FIG. 2 may be formed outside the processor 100. Moreover, the temperature sensor 120 may be provided with arithmetic capabilities so that the processing for estimating the temperatures is performed by the temperature sensor 120 itself.

The processor system according to the embodiment may be incorporated into an information processing apparatus. Examples of such an information processing apparatus include personal computers and various types of portable equipment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A processor comprising:
a sensor which measures a temperature of a certain block of the processor;
a temperature estimation unit which estimates temperatures of a plurality of heat generating blocks of the processor based on the temperature of the certain block detected by the sensor;
a storing unit which contains information on a correspondence between the detected temperature of the certain block and the temperatures of the plurality of heat generating blocks for situations where a maximum load is applied to the entire processor, wherein the temperature estimation unit estimates the temperatures of the plurality of heat generating blocks by referring to the information on the correspondence for situations where the maximum load is applied.

2. The processor according to claim 1, further comprising a load distribution unit which allocates a load among operation blocks of the processor based on the temperatures estimated by the temperature estimation unit.

3. The processor according to claim 1, farther comprising an operating frequency control unit which exercises control for lowering an operating frequency of the processor when the temperatures estimated by the temperature estimation unit exceed a predetermined threshold.

4. The processor according to claim 1, wherein:
the storing unit farther contains information on a correspondence between the temperature of the certain block detected by the sensor and the temperatures of the plurality of heat generating blocks for situations where a load is individually applied to the plurality of heat generating blocks, respectively; and
the temperature estimation unit estimates the temperatures of the plurality of heat generating blocks individually by referring to the information on the correspondence for situations where the load is applied individually.

5. The processor according to claim 4, further comprising a heat amount measurement unit which measures an overall amount of heat of the processor, and
wherein the temperature estimation unit estimates the temperatures of the plurality of heat generating blocks by switching between the correspondence for situations where the maximum load is applied and the correspondence for situations where the load is applied individually, depending on the overall amount of heat measured by the heat amount measurement unit.

6. A processor comprising:
a sensor which measures a temperature of a certain block of the processor;
a temperature estimation unit which estimates temperatures of a plurality of heat generating blocks of the processor based on the temperature of the certain block detected by the sensor; and
a load measurement unit which measures the plurality of heat generating blocks for respective operating loads,
wherein the temperature estimation unit corrects the estimated temperatures of the plurality of heat generating blocks in accordance with the operating loads measured by the load measurement unit.

7. A processor comprising:
a sensor which measures a temperature of a certain block of the processor; and
a temperature estimation unit which estimates temperatures of a plurality of heat generating blocks of the processor based on the temperature of the certain block detected by the sensor,
wherein the sensor is placed in a position where estimation errors in the temperatures of the plurality of heat generating blocks estimated based on the temperature of the certain block detected by the sensor become relatively small.

8. A temperature estimation method comprising:
estimating a maximum temperature of a processor from a temperature of a certain block of the processor detected by a sensor, based on a difference between the detected temperature and a temperature of a heat generating block of the processor for situations where a maximum load is applied to the processor, if an amount of heat generation of the entire processor is relatively large; and
estimating the maximum temperature of the processor from the temperature of the certain block detected by the sensor, based on a difference between the detected temperature and the temperature of the heat generating block for situations where a load is applied to the heat generating block selectively, if the amount of heat generation is relatively small.

9. The temperature estimation method according to claim 8, wherein the estimated maximum temperature of the processor is corrected in accordance with an operating load on the heat generating block.

10. The temperature estimation method according to claim 8, wherein a load is allocated among operation blocks of the processor based on the temperature estimated.

11. The temperature estimation method according to claim 8, wherein control for lowering an operating frequency of the processor is exercised when the estimated temperature exceeds a predetermined threshold.

12. A temperature estimation method comprising:
applying a random load to a processor;
measuring differences between a temperature of a certain block of the processor detected by a sensor and temperatures of a plurality of heat generating blocks of the processor;
determining estimation errors in estimating the temperatures of the plurality of heat generating blocks from the detected temperature; and
adjusting a position of the certain block for the sensor to detect the temperature thereof, so that the estimation errors become relatively smaller.

* * * * *